US006814199B2

(12) United States Patent
Ikeda

(10) Patent No.: US 6,814,199 B2
(45) Date of Patent: Nov. 9, 2004

(54) ONE-WAY CLUTCH

(75) Inventor: Takaaki Ikeda, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/644,911

(22) Filed: Aug. 21, 2003

(65) Prior Publication Data

US 2004/0035671 A1 Feb. 26, 2004

Related U.S. Application Data

(62) Division of application No. 09/948,588, filed on Sep. 10, 2001, now Pat. No. 6,705,445.

(30) Foreign Application Priority Data

| Sep. 11, 2000 | (JP) | ..................................... P2000-274338 |
| Apr. 11, 2001 | (JP) | ..................................... P2001-112666 |

(51) Int. Cl.[7] ............................................. F16D 41/01
(52) U.S. Cl. ................. 192/41 A; 192/113.32
(58) Field of Search .......... 192/41 A, 113.32, 192/45.1, 41 R, 113.3, 112

(56) References Cited

U.S. PATENT DOCUMENTS

| 4,913,271 A | | 4/1990 | Kinoshita et al. |
| 5,320,204 A | | 6/1994 | Riggle et al. |
| 5,601,175 A | | 2/1997 | Kinoshita et al. |
| 5,671,836 A | * | 9/1997 | Shirataki et al. ........ 192/113.32 |
| 6,079,533 A | | 6/2000 | Deglise-Favre et al. |
| 6,435,326 B2 | * | 8/2002 | Shirataki et al. ........... 192/45.1 |
| 6,705,445 B2 | * | 3/2004 | Ikeda ........................ 192/45.1 |
| 2001/0001996 A1 | | 5/2001 | Shirataki et al. |

FOREIGN PATENT DOCUMENTS

| JP | 07-55391 | 12/1995 |
| JP | 2001-159432 | 6/2001 |

* cited by examiner

*Primary Examiner*—Saúl J. Rodriguez
(74) *Attorney, Agent, or Firm*—McGinn & Gibb, PLLC

(57) ABSTRACT

A one-way clutch includes: an inner race; an outer race; a plurality of engaging members disposed between the inner and the outer races; a pair of retainers for retaining the engaging members; springs for urging the engaging members in one direction; and a pair of end bearings which are respectively disposed on both sides between the inner race and the outer race, each of the end bearings being formed into a U-shaped cross section by a first hollow cylindrical portion fitted to an outer peripheral surface of the inner race, a second hollow cylindrical portion fitted to an inner peripheral surface of the outer race, and an annular portion connecting the first and the second hollow cylindrical portions. The one-way clutch is characterized in that recessed portions (11) are formed at least in the inner peripheral surface (8a) of the first hollow cylindrical portion (8) of each of the end bearings (7).

2 Claims, 6 Drawing Sheets

ONE-WAY CLUTCH

This application is a divisional of Ser. No. 09/948,588 filed on Sep. 10, 2001 now U.S. Pat. No. 6,705,445.

BACKGROUND OF THE INVENTION

The present invention relates to a one-way clutch for use in a transmission of an automobile.

As a one-way clutch for use in a transmission of an automobile or the like, one is conventionally known such as in Japanese Examined Utility Model Publication No. Hei. 7-55391. FIG. 8 shows a related one-way clutch and it includes an outer race 50, an inner race 51, a plurality of engaging members (sprags) 52 disposed between the inner and outer races, an inner retainer 53, an outer retainer 54, springs 55, a pair of end bearings 56, and the like.

The aforementioned sprags 52 are retained by the inner retainer 53, and the outer retainer 54 in a space formed by the end bearings 56 fitted to opposite sides between the inner race 51 and the outer race 50, and are disposed in such a manner as to be urged in one direction by the springs 55 disposed between the inner and outer retainers 53 and 54. Each end bearing 56 is formed into a U-shaped cross section and is constituted by a first hollow cylindrical portion 57 fitted to an outer peripheral surface 51a of the inner race 51, a second hollow cylindrical portion 58 fitted to an inner peripheral surface 50a of the outer race 50, and an annular portion 59 which radially connects the first hollow cylindrical portion 57 to the second hollow cylindrical portion 58. The annular portion 59 of each end bearing 56 having the U-shaped cross section is located on each outer side of the one-way clutch. Each annular portion 59 has substantially the same thickness from its inner periphery to its outer periphery and is formed in such a manner as to extend radially so as to be substantially perpendicular to the axis of the inner race 51. In each of the end bearings 56, an inner peripheral surface 57a of the first hollow cylindrical portion 57 opposing the outer peripheral surface 51a of the inner race 51, as well as an outer peripheral surface 58a of the second hollow cylindrical portion 58 opposing the inner peripheral surface 50a of the outer race 50, are formed as smooth surfaces.

In the above-described conventional one-way clutch, the end bearings 56 are disposed between the inner and outer races 51 and 50 and have a function as slide bearings. Namely, the inner peripheral surface 57a of the first hollow cylindrical portion 57 slides on the outer peripheral surface 51a of the inner race 51, and the outer peripheral surface 58a of the second hollow cylindrical portion 58 slides on the inner peripheral surface 50a of the outer race 50. The clearance between the inner race 51 and the first hollow cylindrical portion 57 of the end bearing 56 and the clearance between the outer race 50 and the second hollow cylindrical portion 58 of the end bearing 56 are made extremely small in view of securing the space for the sprags 52 of the one-way clutch. For this reason, there have been problems in that the friction, i.e., the drag torque, between the inner race 51 and the first hollow cylindrical portion 57 of the end bearing 56 and between the outer race 50 and the second hollow cylindrical portion 58 of the end bearing 56 cannot be made small, and that seizure is likely to occur. This friction constitutes a problem particularly between the inner race 51 and the first hollow cylindrical portion 57. The reason is that consideration is generally given to eliminate as much as possible the clearance between the outer race 50 and the second hollow cylindrical portion 58, which is located on the side where the peripheral speed is large, so as to prevent the occurrence of sliding between the two members 50 and 58, whereas a clearance is provided between the inner race 51 and the first hollow cylindrical portion 57, where the peripheral speed is small, so as to positively allow sliding to occur between the two members 51 and 57.

In addition, to overcome the above-described problems, an arrangement has been proposed in which, as shown in FIG. 9, axial grooves 60 are formed at a plurality of circumferential positions in the inner peripheral surface 57a of the first hollow cylindrical portion 57 of the end bearing 56 by lathe turning machining, so as to lower the contact area. However, since the processing of the axial grooves 60 is effected by machining, there are problems in that the cost becomes high, and that mass productivity is poor.

SUMMARY OF THE INVENTION

In view of the above-described problems, the object of the invention is to provide a one-way clutch which excels in mass productivity and in which friction is small.

The object of the invention is to provide a one-way clutch in which an axial groove for enlarging the amount of lubricating oil retained and enhancing the reduction of friction between the first hollow cylindrical portion and the inner race is formed in the inner peripheral surface of the first hollow cylindrical portion of the end bearing.

In order to solve the aforesaid object, the invention is characterized by having the following arrangement.

(1) A one-way clutch comprising:

an inner race;

an outer race;

a plurality of engaging members disposed between the inner and outer races;

retainers for retaining the engaging members;

springs for urging the engaging members in one direction; and a pair of end bearings which are respectively disposed on opposite sides between the inner race and the outer race, each of the end bearings having a U-shaped cross section and including, a first hollow cylindrical portion fitted to an outer peripheral surface of the inner race, a second hollow cylindrical portion fitted to an inner peripheral surface of said outer race, an annular portion connecting the first hollow cylindrical portion to second hollow cylindrical portion, and a plurality of recessed portions formed at least in the inner peripheral surface of the first hollow cylindrical portion of each of the end bearings.

(2) The one-way clutch according to (1), wherein the recessed portions are a plurality of dimple-like dents.

(3) The one-way clutch according to (1), wherein the recessed portions are axial grooves formed by press forming.

(4) The one-way clutch according to (1), wherein the recessed portions are axial grooves formed by press forming and a circumferential groove formed by press forming so as to intersect the axial grooves.

(5) A one-way clutch comprising:

an inner race;

an outer race;

a plurality of engaging members disposed between the inner and outer races;

retainers for retaining the engaging members;

springs for urging the engaging members in one direction; and a pair of end bearings which are respectively disposed on opposite sides between the inner race and the outer race, each of the end bearings having a U-shaped cross section and including,
 a first hollow cylindrical portion fitted to an outer peripheral surface of the inner race,
 a second hollow cylindrical portion fitted to an inner peripheral surface of said outer race,
 an annular portion connecting the first hollow cylindrical portion to second hollow cylindrical portion, and
 a plurality of projections formed at least on the inner peripheral surface of the first hollow cylindrical portion of each of said end bearings.

(6) A one-way clutch including:
 an inner race;
 an outer race;
 a plurality of engaging members disposed between the inner and outer races;
 retainers for retaining the engaging members;
 springs for urging the engaging members in one direction; and
 a pair of end bearings which are respectively disposed on opposite sides between the inner race and the outer race, each of the end bearings having a U-shaped cross section and including,
  a first hollow cylindrical portion fitted to an outer peripheral surface of the inner race,
  a second hollow cylindrical portion fitted to an inner peripheral surface of said outer race,
  an annular portion connecting the first hollow cylindrical portion to second hollow cylindrical portion, and
  axial grooves which extend through to opposite ends of the first hollow cylindrical portion and are formed at a plurality of circumferential positions at least in an inner peripheral of the first hollow cylindrical portion of each of the end bearings, each of the axial grooves having a circular-arc-shaped cross section in which its radial depth becomes larger toward a central portion of the axial groove.

(7) The one-way clutch according to (6), wherein a circumferential groove having a predetermined axial width and a bottom surface which includes portions of the axial grooves where the radial depth becomes maximum is formed in the inner peripheral surface of the first hollow cylindrical portion of each of the end bearings.

DETAILED DESCRIPTION OF PREFERRED EMBODIMENTS

First Embodiment

Figure 1:
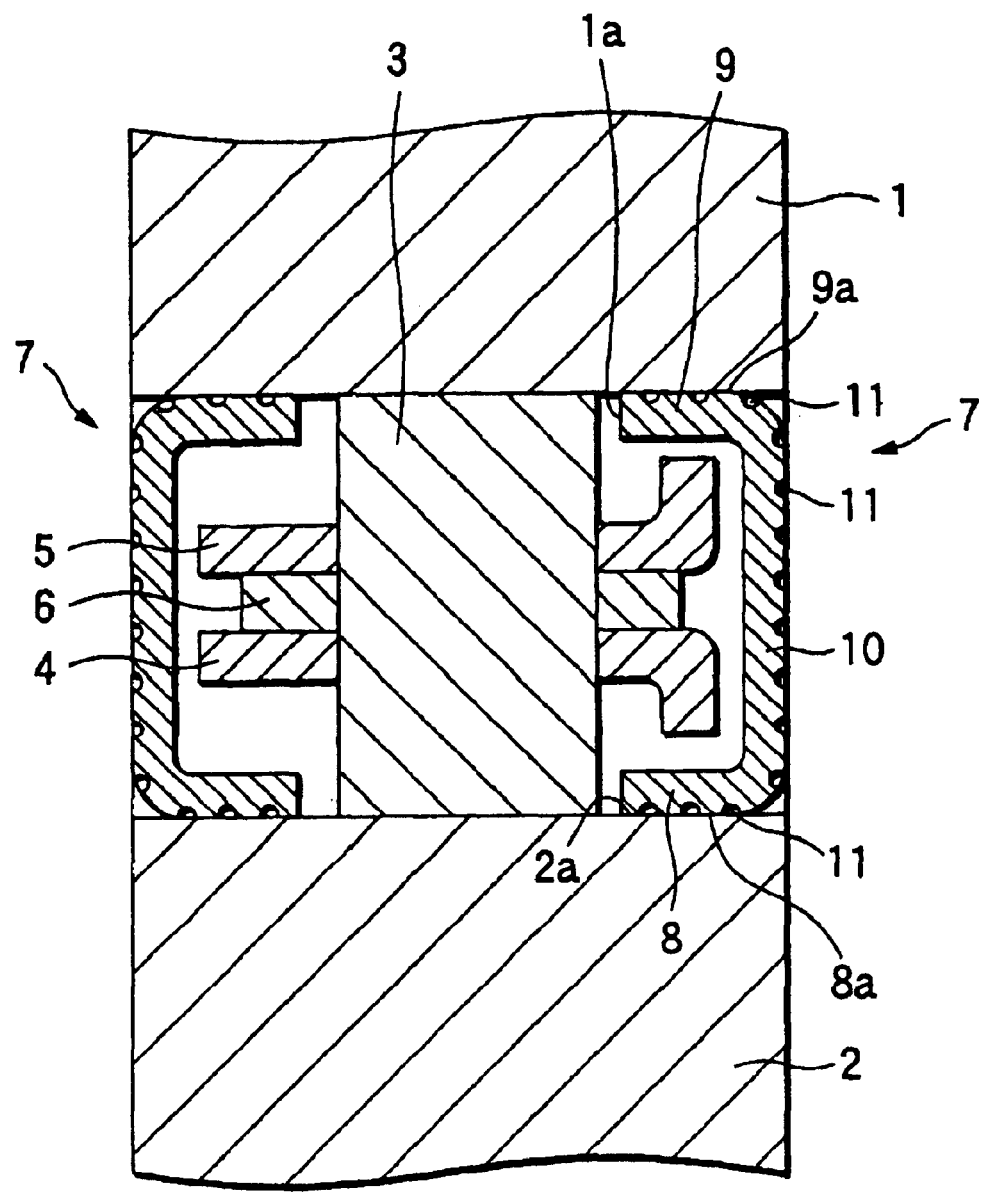
FIG. 1 is a cross-sectional view of a one-way clutch in accordance with an embodiment of the invention.
Figure 2:
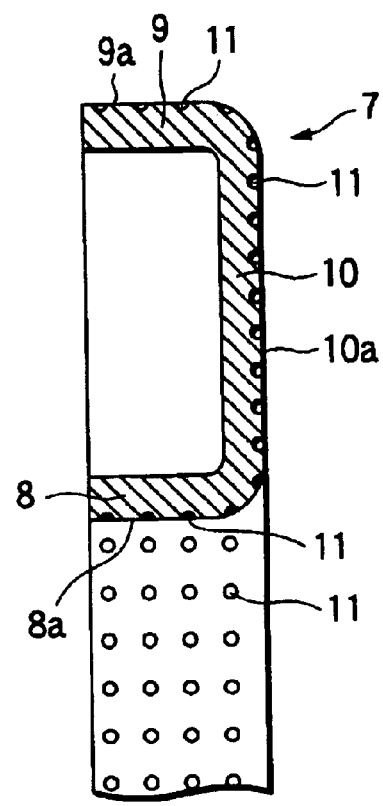
FIG. 2 is a cross-sectional view of an end bearing shown in FIG. 1.

Referring to FIGS. 1 and 2, a description will be given of a first embodiment of the invention. A one-way clutch in accordance with the embodiment of the invention includes an outer race 1, an inner race 2, a plurality of engaging members (sprags) 3 disposed between the inner and outer races, an inner retainer 4, an outer retainer 5, springs 6, a pair of end bearings 7, and the like.

The aforementioned sprags 3 are retained by the inner retainer 4 and the outer retainer 5 in a space formed by the inner race 2, the outer race 1, and the end bearings 7 fitted to both sides between the inner race 2 and the outer race 1, and are disposed in such a manner as to be urged in one direction by the springs 6 disposed between the inner and outer retainers 4 and 5. Each end bearing 7 is formed into a U-shaped cross section and comprises a first hollow cylindrical portion 8 fitted to an outer peripheral surface 2a of the inner race 2, a second hollow cylindrical portion 9 fitted to an inner peripheral surface 1a of the outer race 1, and an annular portion 10 which radially connects the first hollow cylindrical portion 8 to the second hollow cylindrical portion 9. The annular portion 10 of each end bearing 7 having the U-shaped cross section is located on each outer side of the one-way clutch. Each annular portion 10 has substantially the same thickness from its inner periphery to its outer periphery and is formed in such a manner as to extend radially so as to be substantially perpendicular to the axis of the inner race 2.

Recessed portions for reducing friction are formed in outer surfaces of each of the above-described end bearings 7, i.e., an inner peripheral surface 8a of the first hollow cylindrical portion 8 opposing the outer peripheral surface 2a of the inner race 2, an outer peripheral surface 9a of the second hollow cylindrical portion 9 opposing the inner peripheral surface 1a of the outer race 1, and an outside surface 10a of the annular portion 10. As an example of these recessed portions, in FIGS. 1 and 2, a multiplicity of dimple-like dents 11 are formed, respectively. The dents 11 may be formed in the inner peripheral surface 8a of the first hollow cylindrical portion 8 and the outer peripheral surface 9a of the second hollow cylindrical portion 9 which are the sliding surfaces, but the dents 11 are indispensable particularly in the inner peripheral surface 8a of the first hollow cylindrical portion 8. As can be fully understood from the description of the conventional structure, the reason for this is that consideration is generally given to eliminate as much as possible the clearance between the outer race 1 and the second hollow cylindrical portion 9, which is located on the side where the peripheral speed is large, so as to prevent the occurrence of sliding between the two members 1 and 9, whereas a clearance is provided between the inner race 2 and the first hollow cylindrical portion 8, where the peripheral speed is small, so as to positively allow sliding to occur between the two members 1 and 8.

The aforementioned end bearing 7 is formed as follows. A doughnut-shaped disk having a predetermined length in the radially deforming direction is stamped out from a metallic thin plate by press working. At this time, the dimple-like dents 11 having a predetermined depth are simultaneously formed in overall surface at one side by die pressing. Subsequently, the inner and outside radial portions are subjected to drawing by press working to form the first hollow cylindrical portion 8 and the second hollow cylindrical portion 9 such that the dimple-like dents 11 appear on the outside surface side. As a result, the end bearing 7 shown in FIG. 2 is formed.

Since the above-described processing of the dimple-like dents is effected for the entire surface, die working is facilitated since it is not so important to take into consideration the positions of the dents 11; however, unnecessary dents 11 are formed in the outside surface 10a of the annular portion 10 as well. In a case where there is a need to avoid this, it suffices if, when the doughnut-shaped disk is stamped out, the dimple-like dents 11 are formed only in a radial area for forming the first hollow cylindrical portion 8 or in radial areas for forming the first hollow cylindrical portion 8 and the second hollow cylindrical portion 9. If this arrangement is adopted, the dents 11 are formed only in the inner peripheral surface 8a of the first hollow cylindrical portion 8 or in both the inner peripheral surface 8a of the first hollow cylindrical portion 8 and the outer peripheral surface 9a of the second hollow cylindrical portion 9, which constitute the sliding surfaces. As described before, these dents 11 must be formed at least in the inner peripheral surface 8a of the first hollow cylindrical portion 8, as described before.

Second Embodiment

Figure 3:
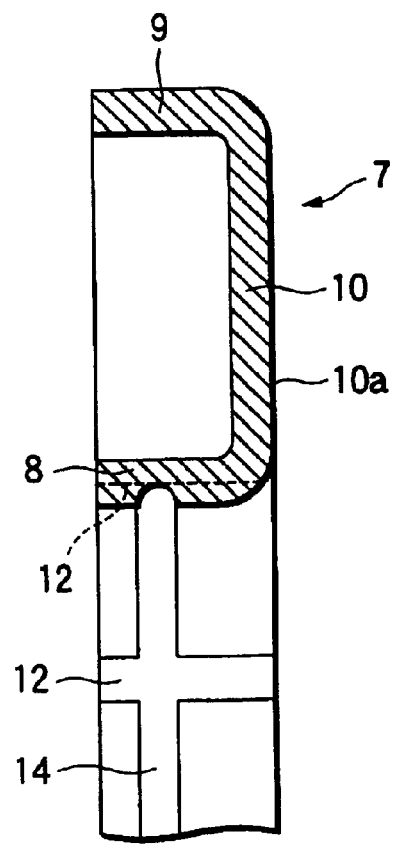
FIG. 3 is a cross-sectional view of the end bearing in accordance with a second embodiment of the invention.

FIG. 3 shows a second embodiment of the present invention in which axial grooves 12 are formed at a plurality of circumferential positions in the inner peripheral surface 8a of the first hollow cylindrical portion 8 by press working, and one circumferential groove 14 which intersects these axial grooves 12 is simultaneously formed by press working. These axial grooves continue from an end of the first hollow cylindrical portion 8 to the outside surface 10a of the annular portion 10 to allow lubricating oil to circulate. In addition, although, in FIG. 3, these axial grooves 12 are formed only in the inner peripheral surface 8a of the first hollow cylindrical portion 8, the axial grooves 12 may be formed also in the outer peripheral surface 9a of the second hollow cylindrical portion 9, as necessary. Furthermore, the axial grooves 12 may be formed in the entire outer surfaces of the end bearing 7, i.e., the inner peripheral surface 8a of the first hollow cylindrical portion 8, the outer peripheral surface 9a of the second hollow cylindrical portion 9, and the outside surface 10a of the annular portion 10. In addition, a plurality of circumferential grooves 14 may be provided in the axial direction, or either one of the circumferential groove(s) 14 and the axial grooves 12 may be omitted, as necessary. In addition, the press working of the axial grooves 12 and the circumferential groove(s) 14 is effected in the same way as described with reference to FIG. 2.

Third Embodiment

Figure 4:
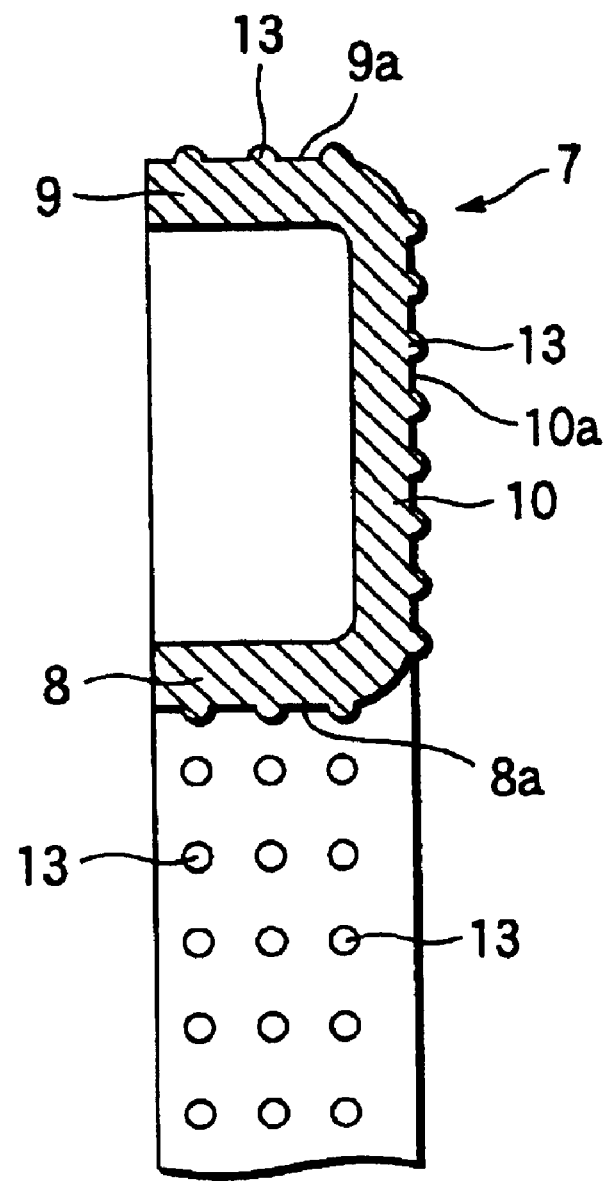
FIG. 4 is a cross-sectional view of the end bearing in accordance with still a third embodiment of the invention.

FIG. 4 shows a third embodiment in which a multiplicity of projections 13 are formed on the outer surfaces of the end bearing 7, i.e., the inner peripheral surface 8a of the first hollow cylindrical portion 8, the outer peripheral surface 9a of the second hollow cylindrical portion 9, and the outside surface 10a of the annular portion 10. It suffices if the projections 13 are formed on the inner peripheral surface 8a of the first hollow cylindrical portion 8 and the outer peripheral surface 9a of the second hollow cylindrical portion 9, which are the sliding surfaces, but the projections 13 are indispensable particularly on the inner peripheral surface 8a of the first hollow cylindrical portion 8. The reason for this has already been described with reference to FIG. 2. In addition, these projections 13 are also worked by press forming, and the working process is the same as in FIG. 2.

Fourth Embodiment

Figure 5:
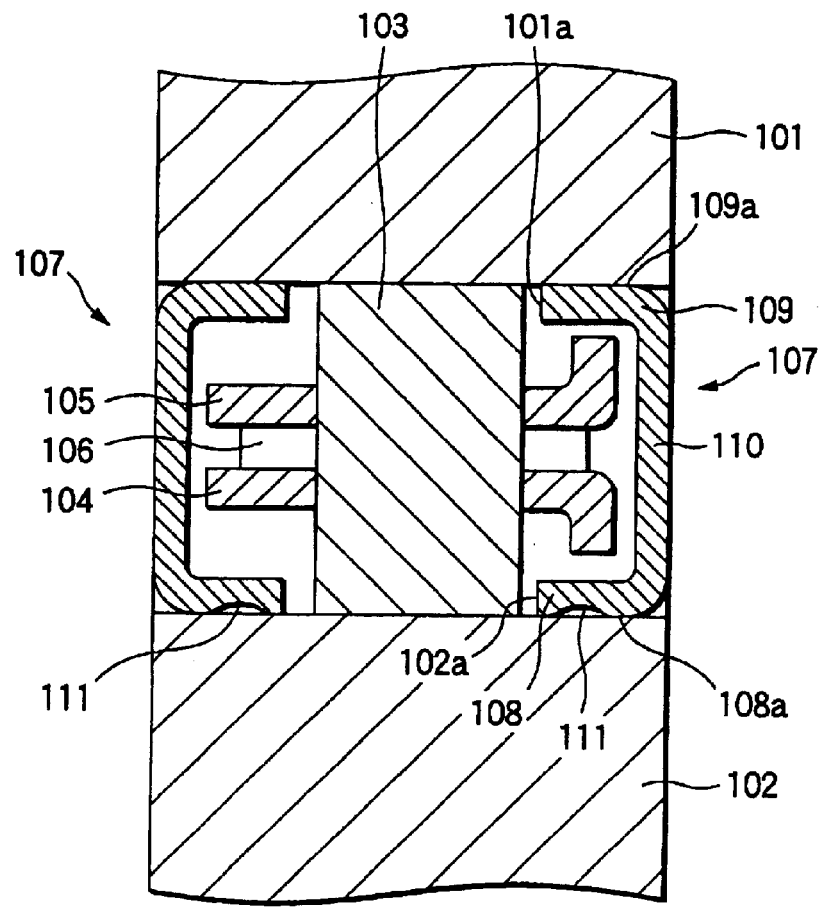
FIG. 5 is a cross-sectional view of a one-way clutch in accordance with an fourth embodiment of the invention.
Figure 6:
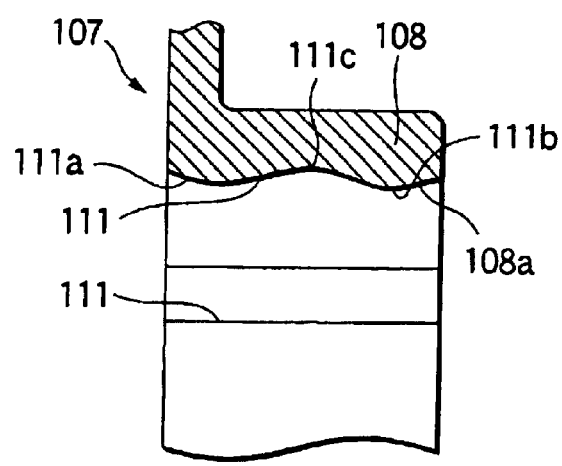
FIG. 6 is an enlarged cross-sectional view of an end bearing shown in FIG. 5.

Referring to FIGS. 5 and 6, a description will be given of a fourth embodiment of the invention. A one-way clutch in accordance with the embodiment of the invention comprises an outer race 101, an inner race 102, a plurality of engaging members (sprags) 103 disposed between the inner and outer races, an inner retainer 104, an outer retainer 105, springs 106, a pair of end bearings 107, and the like.

The aforementioned sprags 103 are retained by the inner retainer 104 and the outer retainer 105 in a space formed by the inner race 102, the outer race 101 and the end bearings 107 fitted to opposite sides between the inner race 102 and the outer race 101, and are disposed in such a manner as to be urged in one direction by the springs 106 disposed between the inner and outer retainers 104 and 105. Each end bearing 107 is formed into a U-shaped cross section and includes a first hollow cylindrical portion 108 fitted to an outer peripheral surface 102a of the inner race 102, a second hollow cylindrical portion 109 fitted to an inner peripheral surface 101a of the outer race 101 and an annular portion 110 which radially connects the first hollow cylindrical portion 108 to the second hollow cylindrical portion 109. The annular portion 110 of each end bearing 107 with the U-shaped cross section is located on each outer side of the one-way clutch. Each annular portion 110 has substantially the same thickness from its inner periphery to its outer periphery and is formed in such a manner as to extend radially so as to be substantially perpendicular to the axis of the inner race 102.

To reduce friction between the first hollow cylindrical portion 108 and the inner race 102, a plurality of axial grooves 111, which serve as lubricating oil reservoirs, are formed on the circumference of an outer surface of each end bearing 107, i.e., an inner peripheral surface 8a of the first hollow cylindrical portion 108 opposing the outer peripheral surface 102a of the inner race 102, in such a manner as to extend through to opposite ends of the first hollow cylindrical portion 108. Each of these axial grooves 111 has a circular-arc-shaped cross section in which the radial depth becomes larger toward its central portion. Namely, the axial groove 11 is formed in such a way that the circular-arc-shaped surface becomes gradually deeper in the radial direction from its both ends 111a and 111b toward its axially central portion 111c. It should be noted that these axial grooves are formed by cutting or press forming, and their maximum depth is set to approximately 0.2 to 0.5 mm or thereabouts.

In the fourth embodiment shown in FIGS. 5 and 6, lubricating oil reservoirs are formed in the entire axial surface of the first hollow cylindrical portion 108 of the end bearing 107 by the above-described axial grooves 111, with the result that the sliding portion between the entire surface of the inner peripheral surface 108a of the first hollow cylindrical portion 108 of the end bearing 107 and the entire surface of the outer peripheral surface 102a of the inner race 102 is constantly lubricated sufficiently, thereby improving the anti-seizure characteristic. In addition, the contact area between the first hollow cylindrical portion 108 and the inner race 102 can be substantially reduced by the plurality of axial grooves 111, which, together with the above-described sufficient lubrication, makes it possible to enhance the reduction of friction between the first hollow cylindrical portion 108 and the inner race 102. Further, since the axial grooves have circular-arc-shaped cross sections, the amount of lubricating oil retained is large, and since the lubricating oil is collected by centrifugal force on the circular-arc-shaped surfaces extending from both ends 111a and 111b toward the central portion 111c of the axial grooves 11, a shortage of the supply of lubricating oil does not occur.

Fifth Embodiment

Figure 7:
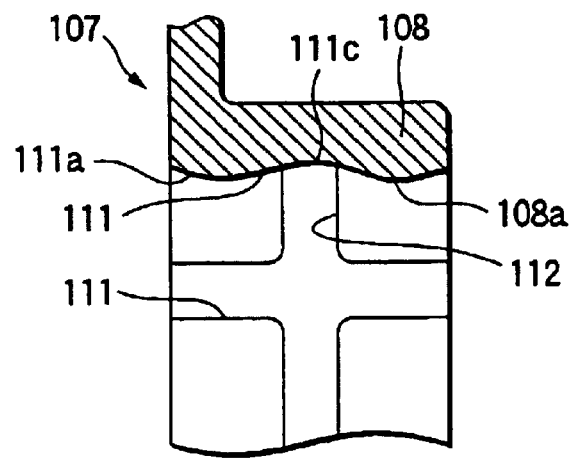
FIG. 7 is an enlarged cross-sectional view of the end bearing in accordance with a fifth embodiment of the invention.
Figure 8:
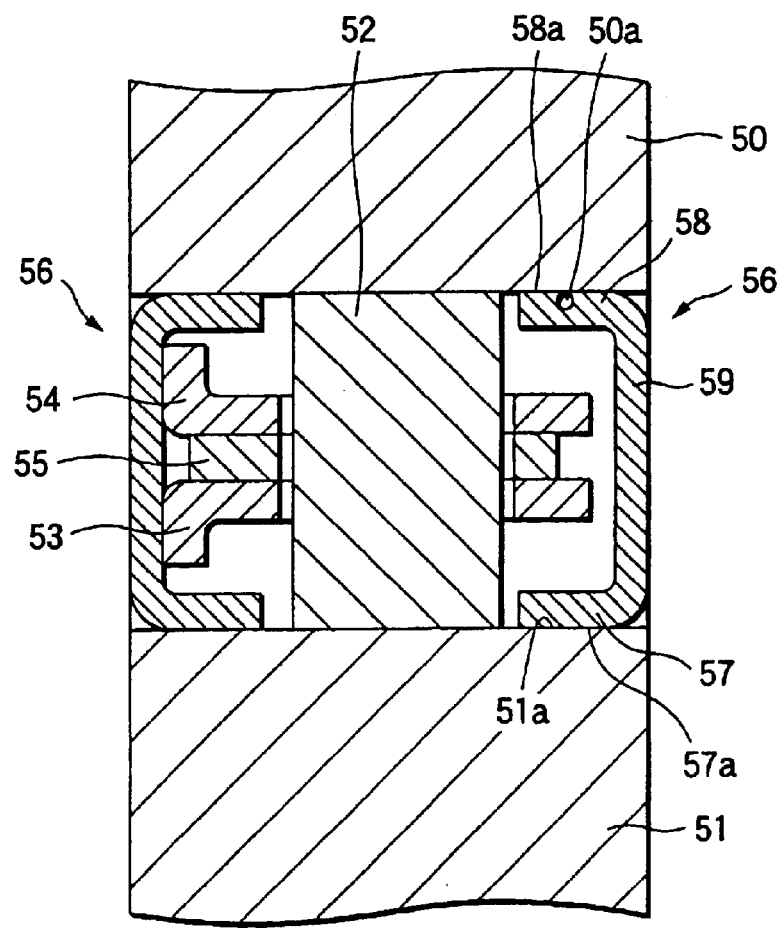
FIG. 8 is a cross-sectional view of a conventional one-way clutch.
Figure 9:
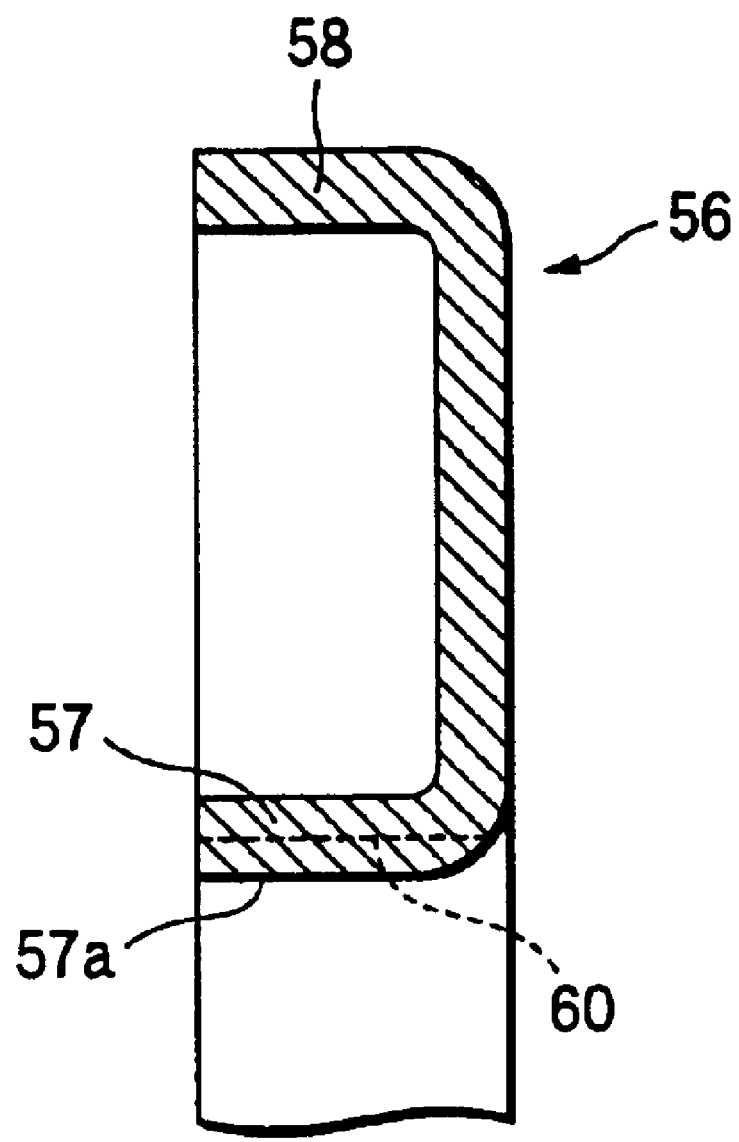
FIG. 9 is a cross-sectional view of another end bearing of a conventional one-way clutch.

FIG. 7 shows a fifth embodiment of the invention. In a one-way clutch in accordance with the embodiment of the invention, a plurality of axial grooves 111 having utterly identical structure of the axial grooves in the fourth embodiment shown in FIGS. 5 and 6, and a circumferential groove 112 having a predetermined axial width which includes portions of the central portion 111c of the axial grooves 11 where the radial depth becomes maximum are formed at the inner peripheral surface 108a of the first hollow cylindrical portion 108 off each end bearing 107. In the fifth embodiment shown in FIG. 7, as compared with the fourth embodiment shown in FIGS. 5 and 6, the function of lubricating oil reservoirs improves by the portion in which the circumferential groove 112 is added, and the effect of reducing friction becomes greater.

It should be noted that although, in the above-described two embodiments, the axial grooves 111, or the axial grooves 111 and the circumferential groove 112, are formed in the inner peripheral surface 108a of the first hollow cylindrical portion 108, the grooves 111 and 112 may be formed also in the outer peripheral surface 109a of the second hollow cylindrical portion 109.

Experiment

A table 1 shows an experimental result of friction measurement of the one-way clutch having the recessed portions at the end bearing as in the second Embodiment of the present invention in comparison with that in the conventional art in which the end bearing having no recessed portion. Experiment condition:

Inner race: rotating, Outer race: fixed
Temperature: Normal temperature
Oil feed rate: 100 cc/min

TABLE 1

Experimental result of Friction measurement

| Inner race rotational frequency | 1500 rpm | 3000 rpm |
|---|---|---|
| End bearing having recessed portion | 0.50 N*m | 0.45 N*m |
| End bearing having no recessed portion | 0.83 N*m | 0.97 N*m |

With the one-way clutch according to the invention, since recessed portions are formed in the inner peripheral surface of the first hollow cylindrical portion of each end bearing which is the side where sliding particularly occurs, it is possible to reduce a contact area for the inner race, thereby making it possible to reduce friction, i.e., drag torque.

In addition, a lubricating oil film is likely to be formed by virtue of a multiplicity of recesses and projections, thereby making it possible to improve the anti-seizure characteristic.

Furthermore, since the axial grooves are formed not by machining but by press forming, the one-way clutch excels in mass productivity and makes it possible to reduce cost.

Further according to the invention, lubricating oil reservoirs are formed in the entire axial surface of the first hollow cylindrical portion of the end bearing by the axial grooves, so that the sliding portion between the entire surface of the inner peripheral surface of the first hollow cylindrical portion and the entire surface of the outer peripheral surface of the inner race is constantly lubricated sufficiently, thereby improving the anti-seizure characteristic. In addition, the contact area between the first hollow cylindrical portion and the inner race can be substantially reduced by the plurality of axial grooves, which, together with the above-described sufficient lubrication, makes it possible to enhance the reduction of friction between the first hollow cylindrical portion and the inner race. Further, since the axial grooves have circular-arc-shaped cross sections, the amount of lubricating oil retained is large, and since the lubricating oil is collected by centrifugal force on these circular-arc-shaped surfaces, a shortage of the supply of lubricating oil does not occur.

In addition, the arrangement provided is such that formed in the inner peripheral surface of the first hollow cylindrical portion of each of the end bearings are the axial grooves with circular-arc-shaped cross sections and a circumferential groove a circumferential groove with a predetermined axial width, which includes portions of the central portions of the axial grooves where the radial depth becomes maximum, is additionally formed therein. The lubricating oil reservoirs are thus made larger, and the effect of reducing friction becomes larger.

What is claimed is:

1. A one-way clutch including:
    an inner race;
    an outer race;
    a plurality of engaging members disposed between the inner and outer races;
    retainers for retaining the engaging members;
    springs for urging the engaging members in one direction; and
    a pair of end bearings which are respectively disposed on opposite sides between the inner race and the outer race, each of the end bearings having a U-shaped cross section and including:
        a first hollow cylindrical portion fitted to an outer peripheral surface of the inner race;
        a second hollow cylindrical portion fitted to an inner peripheral surface of said outer race;
        an annular portion connecting the first hollow cylindrical portion to said second hollow cylindrical portion; and
        axial grooves which extend through to opposite ends of the first hollow cylindrical portion and are formed at a plurality of circumferential positions at least in an inner peripheral of the first hollow cylindrical portion of each of the end bearings, each of the axial grooves having a circular-arc-shaped cross section in which its radial depth becomes larger toward a central portion of the axial groove.

2. The one-way clutch according to claim 1, wherein a circumferential groove having a predetermined axial width and a bottom surface which includes portions of the axial grooves where the radial depth becomes maximum is formed in the inner peripheral surface of the first hollow cylindrical portion of each of the end bearings.

* * * * *